(12) United States Patent
Downey et al.

(10) Patent No.: US 7,784,818 B2
(45) Date of Patent: Aug. 31, 2010

(54) SIDE CURTAIN AIRBAG DIRECTIONAL DEPLOYMENT APPARATUS

(75) Inventors: Brian Downey, Farmington Hills, MI (US); Kristi Elliott-Rumberger, Farmington Hills, MI (US); Neal Osterhout, Farmington Hills, MI (US)

(73) Assignee: Nissan Technical Center North America, Inc., Farmington HIlls, MI (US)

( * ) Notice: Subject to any disclaimer, the term of this patent is extended or adjusted under 35 U.S.C. 154(b) by 580 days.

(21) Appl. No.: 11/694,318

(22) Filed: Mar. 30, 2007

(65) Prior Publication Data

US 2008/0238053 A1 Oct. 2, 2008

(51) Int. Cl.
*B60R 21/213* (2006.01)

(52) U.S. Cl. ................. 280/728.3; 280/730.2

(58) Field of Classification Search ............ 280/730.2, 280/728.36, 728.2, 728.3
See application file for complete search history.

(56) References Cited

U.S. PATENT DOCUMENTS

| | | | | |
|---|---|---|---|---|
| 6,364,346 B1 * | 4/2002 | Preisler et al. | ........... | 280/730.2 |
| 6,485,048 B2 * | 11/2002 | Tajima et al. | ............ | 280/728.2 |
| 6,863,300 B2 * | 3/2005 | Ryu | ......................... | 280/730.2 |
| 6,883,828 B2 * | 4/2005 | Ohki | ....................... | 280/730.2 |
| 7,134,682 B2 * | 11/2006 | Totsuka et al. | ........... | 280/728.2 |
| 7,410,189 B2 * | 8/2008 | Choi | ....................... | 280/730.2 |
| 2002/0190507 A1 * | 12/2002 | Sante et al. | ............. | 280/730.2 |
| 2003/0006590 A1 * | 1/2003 | Aoki et al. | ............... | 280/730.2 |
| 2006/0131849 A1 * | 6/2006 | Ochiai | ..................... | 280/730.2 |

* cited by examiner

*Primary Examiner*—Eric Culbreth
*Assistant Examiner*—Karen Jane J Amores
(74) *Attorney, Agent, or Firm*—Young Basile

(57) ABSTRACT

At least one guide member extends longitudally along at least a portion of a stowed side curtain airbag. At least one guide ramp directs deployment of the side curtain airbag toward the openable passage defined at least in part by one or more trim pieces. The guide member surrounds the side curtain airbag on three sides to define an airbag deployment opening facing a rear surface of the one or more trim pieces adjacent the openable passage. The interior trim stucture covers the stowed side curtain airbag and allows deployment of the side curtain airbag through an interface joint to a position along a sidewall of a passenger compartment adjacent a rear seat location of a two-door coupe style vehicle. The interface joint defines an openable passage along the first and second abutting edges allowing deployment of a side curtain airbag through the interface joint.

19 Claims, 4 Drawing Sheets

SIDE CURTAIN AIRBAG DIRECTIONAL DEPLOYMENT APPARATUS

RELATED APPLICATIONS

This application is related to an application Ser. No. 11/694,406 entitled "REAR PILLAR TO CENTER PILLAR TRIM JOINT CONNECTION FOR REAR SEAT PASSENGER AIRBAG SIDE CURTAIN DEPLOYMENT" filed contemporaneously herewith.

FIELD OF THE INVENTION

The present invention relates to a side curtain airbag directional deployment apparatus for directing deployment of the side curtain airbag through an interface joint between one or more trim pieces to a position along a sidewall of a passenger compartment adjacent to a rear seat location of a vehicle.

BACKGROUND

It is generally known for conventional airbag deployment to occur through a headliner assembly to an upper trim interface structure. However, for a coupe version vehicle, the headliner formation at the rear is not possible due to manufacturing limitations. It would be desirable to provide a side curtain airbag deployment apparatus to direct deployment of the side curtain airbag through an interface joint defined at least in part by one or more trim pieces. It would be desirable to provide a side curtain airbag deployment apparatus that included at least one guide member extending longitudinally along at least a portion of a stowed side curtain airbag. It would be desirable to provide a side curtain airbag deployment apparatus that included at least one guide ramp directing deployment of the side curtain airbag toward an openable passage defined at least in part by one or more trim pieces. It would be desirable to provide a side curtain airbag deployment apparatus that surrounded the side curtain airbag on three sides to define an airbag deployment opening facing a rear surface of one or more trim pieces adjacent an openable passage. It would be desirable to provide a side curtain airbag deployment apparatus that included a generally U-shaped cross section.

SUMMARY

According to an embodiment of the invention, an apparatus for guiding deployment of a stowed side curtain airbag along a side wall of a passenger compartment of a vehicle can include at least one trim piece defining at least a portion of an openable passage allowing deployment of a side curtain airbag, and at least one guide member extending longitudinally along at least a portion of the stowed side curtain airbag. The guide member can include at least one guide ramp directing deployment of the side curtain airbag toward the openable passage defined at least in part by one or more trim pieces. The guide member surrounds the side curtain airbag on three sides to define an airbag deployment opening facing a rear surface of the trim piece adjacent the openable passage.

In an interior trim structure for deployment of a side curtain airbag along a sidewall of a passenger compartment adjacent a rear seat location of a vehicle, a group of low-retention force projections and complementary interlocking apertures can be formed along abutting first and second edges of a rear pillar trim piece and a center pillar trim piece to temporarily secure an interface joint defined between the abutting first and second edges along the trim pieces with respect to one another when in a closed position. The interface joint can define an openable passage through the interface joint between the first and second edges allowing deployment of a side curtain airbag. At least one guide member can be provided to extend longitudinally along at least a portion of a stowed side curtain airbag. The guide member can include at least one guide ramp directing deployment of the side curtain airbag toward the openable passage defined at least in part by first and second trim pieces. The guide member surrounds the side curtain airbag on three sides to define an airbag deployment opening facing a rear surface of the trim pieces adjacent the openable passage.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
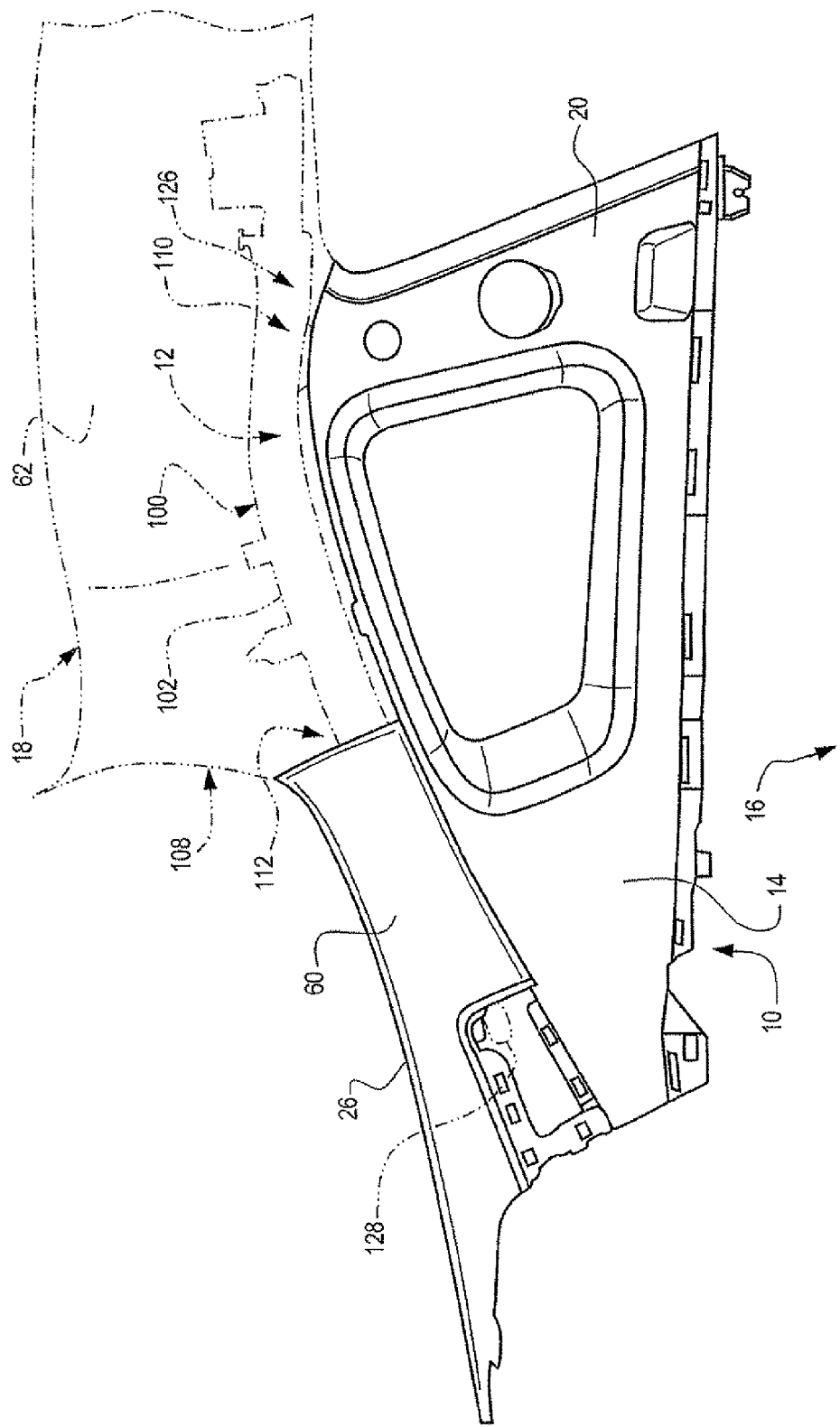
FIG. 1 is a side elevational view of a rear pillar trim piece and an interface joint with a center pillar trim piece.

Referring now to FIGS. 1-4, an interior trim structure 10 is illustrated for covering a stowed side curtain airbag 12, while allowing deployment of the side curtain airbag 12 along a sidewall 14 of a passenger compartment 16 in a vehicle 18. The interior trim structure 10 can include a first trim piece 20 having at least one aperture 22 formed along a first edge 24, and a second trim piece 26 having at least one low-retention force projection 28 receivable within the aperture 22 formed in the first trim piece 20. The projection 28 is formed along a second edge 30 of the second trim piece 26 and located in complementary position with respect to the aperture 22 of the first edge 24 of the first trim piece 20 to temporarily secure an interface joint 32 defined between the first and second edges 24,30 along the first and second trim pieces 20,26 with respect to one another when in a closed position 34, and to define an openable passage 36 along the interface joint 32 between the first and second edges 24,30 allowing deployment of a side curtain airbag 12. By way of example and not limitation, the first and second trim pieces 20,26 can include a center pillar trim component and a rear pillar trim component. The center pillar trim component 20 can define an interface joint 32 between adjoining first and second edges 24,30 with the rear pillar trim component 26. The interface joint 32 defines an openable passage 36 along the interface joint 32 between the first and second edges 24,30, allowing deployment of a side curtain airbag 12 through the interior trim structure 10 to a position along a sidewall 14 of a passenger compartment 16 adjacent a rear seat location of a two-door coupe style vehicle 18.

The at least one aperture 22 in the first trim piece 20 can include a first group of apertures 38 for locating and guiding movement of the first and second trim pieces 20,26 with respect to one another. A second group of apertures 40 can be provided for releasably locking the first and second trim pieces 20,26 in the closed position 34 with respect to one another. The at least one projection 28 of the second trim piece 26 can include a first group of projections 42 for locating and guiding movement of the first and second trim pieces 20,26 with respect to one another in cooperating with the first group of apertures 38. A second group of projections 44 can be provided for releasably locking the first and second trim pieces 20,26 in the closed position 34 with respect to one another in cooperation with the second group of apertures 40. In other words, the at least one aperture 22 and at least one projection 28 can include a first group of apertures 38 and corresponding projections 42 for locating and guiding movement of the first and second trim pieces 20,26 with respect to one another, and a second group of apertures 40 and corresponding projections 44 can be provided for releasably locking the first and second trim pieces 20,26 in the closed position 34 with respect to one another.

The projection 28 can include an elongate, generally L-shaped, member 46 having a locking tab 48 located on a distal end 50 for releasable engagement with a shoulder 52 defining a portion of the corresponding aperture 22. The at least one projection 28 can also include an elongated member 54 having a periphery 56 slidably engageable within a guiding surface 58 associated with the corresponding aperture 22 for locating the first and second trim pieces 20,26 with respect to one another. The projection 28 and corresponding aperture 22 provide a desired fit and finish tolerance of the interface joint 32 between the first and second edges 24,30 when in the closed position 34.

At least one of the trim pieces 20,26 can include a fabric covering 60. The first and second trim pieces 20,26 can include a center pillar trim piece formed of a high-pressure injection molded material defining a lower garnish assembly, and a rear pillar trim piece formed of a low pressure injection molded fabric covered material defining an upper garnish assembly. A plurality of connector receiving pockets 62 can be provided for securing the first and second trim pieces 20,26 to a body of the vehicle 18.

According to an embodiment of the present invention, an interior trim structure 10 for deployment of a side curtain airbag 12 along a sidewall 14 of a passenger compartment 16 adjacent a rear seat location of a vehicle 18 can include a group of low-retention force projections 44 and complementary interlocking apertures 40 along abutting first and second edges 24,30 of a rear pillar trim piece 26 and a center pillar trim piece 20 to temporarily secure an interface joint 32 defined between the abutting first and second edges 24,30 along the trim pieces 20,26 with respect to one another when in a closed position 34, and to define an openable passage 36 through the interface joint 32 between the first and second edges 24,30 allowing deployment of a side curtain airbag 12. Optionally, at least one locator guide projection 42 and complementary receiving aperture 38 can be formed along the abutting first and second edges 24,30 of the trim pieces 20,26 to align the interface joint 32 defined between the first and second edges 24,30 along the trim pieces 20,26 with respect to one another in the closed position 34 and to guide opening movement of the interface joint 32 during deployment of a side curtain airbag 12. Alternatively, a group of locator guide projections 42 and complementary receiving apertures 38 formed along the abutting first and second edges 24,30 of the trim pieces 20,26 can align the interface joint 32 defined between the first and second edges 24,30 along the trim pieces 20,26 with respect to one another in the closed position 34, and can guide opening movement of the interface joint 32 during deployment of a side curtain airbag 12.

The low-retention force projection 44 can include an elongate, generally L-shaped, member 46 having a locking tab 48 located on a distal end 50 for releasable engagement with a shoulder 52 defining a portion of the corresponding aperture 40. The locator guide projection 42 can include an elongate member 54 having a periphery 56 slidingly engageable with a guiding surface 58 associated with the corresponding aperture 38 for locating the trim pieces 20,26 with respect to one another. The combination of projections 42,44 and corresponding apertures 38,40 provide a desired fit and finish tolerance of the interface joint 32 when in the closed position 34. A fabric covering 60 can be provided for at least one of the trim pieces 20,26. In one embodiment of the invention, the fabric covering 60 can be provided on the rear pillar trim piece 26.

Figure 2:
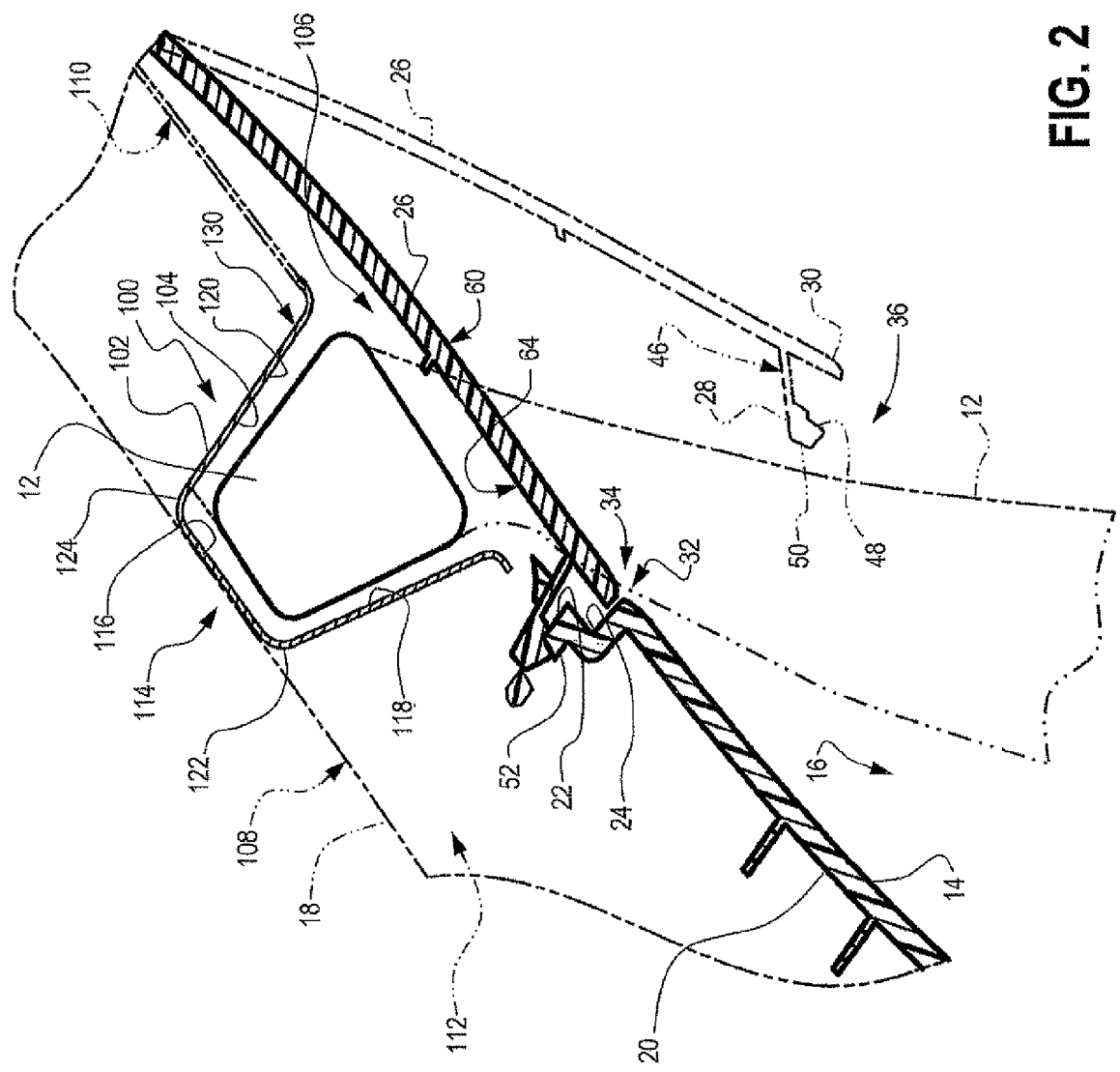
FIG. 2 is a cross-sectional view of the interface joint between the rear pillar trim component and the center pillar trim component including a low-retention force projection of one trim piece receivable within an aperture formed in the other trim piece.
Figure 3:
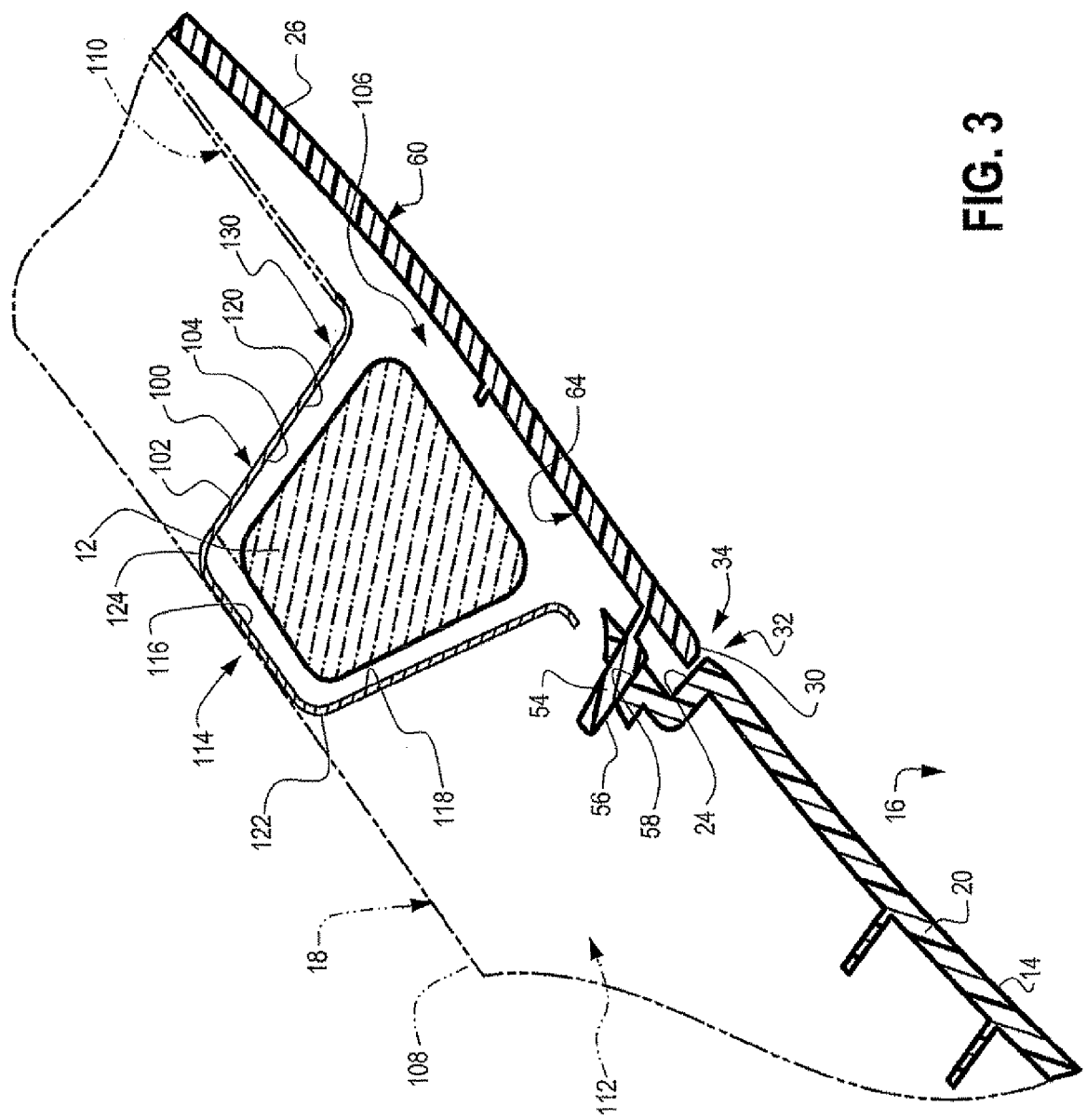
FIG. 3 is a cross-sectional view showing a locating and guiding projection formed on one trim component releasably engageable within a locating and guiding aperture formed in the other component.
Figure 4:
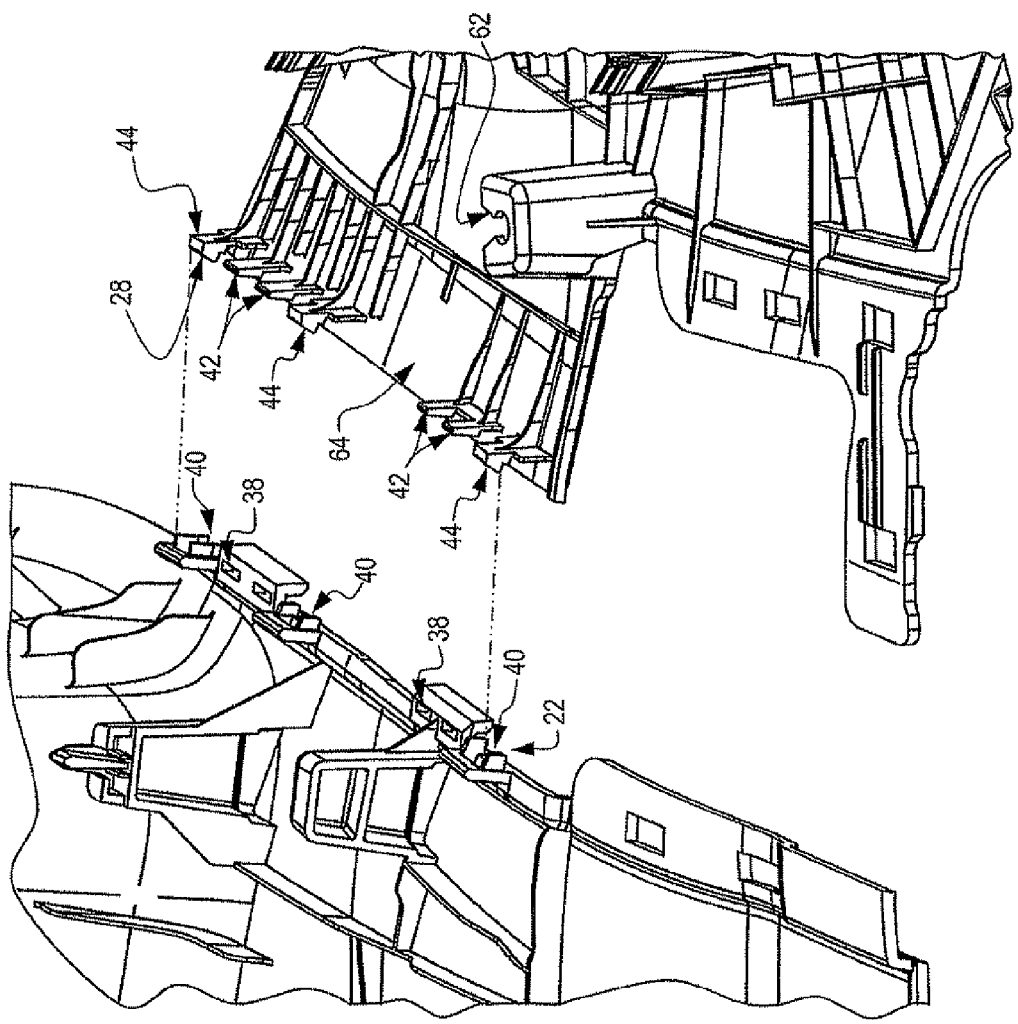
FIG. 4 is a perspective, exploded rear view of the interface joint defined between first and second edges along a rear pillar trim piece and a center pillar trim piece to define an openable passage along the interface joint, allowing deployment of a side curtain airbag along a sidewall of a passenger compartment adjacent a rear seat location of a two-door coupe style vehicle.

As seen in FIG. 1, a side curtain airbag 12 is initially installed above the center pillar trim component 20 between the upper edge and the headliner 62. The stowed side curtain airbag 12 extends along the upper edge of the center pillar trim component 20 to be enclosed by the rear pillar trim component 26, so that the interface joint 32 defines an openable passage 36 between first and second adjoining edges 24,30 allowing deployment of the side curtain airbag 12 along the sidewall 14 of the passenger compartment 16 of the vehicle 18. As best seen in FIGS. 2 and 3, the side curtain airbag 12 is directed toward the inner surface 64 of the rear pillar trim component 26 in order to disengage the low-retention force projection 28 from the corresponding aperture 22, while the locating and guiding projections 42 cooperatively interact with the locating and guiding apertures 38 to guide the opening movement of the rear pillar trim component 26 from the closed position 34, shown in solid line in FIG. 2, to the openable passage 36, as shown in phantom in FIG. 2.

Referring to FIGS. 1-3, an embodiment of the invention includes an apparatus 100 for guiding deployment of a stowed side curtain airbag 12 along a sidewall 14 of a passenger compartment 16 in a vehicle 18. The apparatus 100 can include at least one trim piece 20 and/or 26 defining at least a portion of an openable passage 36 along an interface joint 32 allowing deployment of a side curtain airbag 12. At least one guide member 102 extends longitudinally along at least a portion of the stowed side curtain airbag 12 and includes at least one guide ramp 104 directing deployment of the side curtain airbag 12 toward the openable passage 36 defined at least in part by the at least one trim piece 20 and/or 26. The guide number 102 surrounds the side curtain airbag 12 on three sides to define an airbag deployment opening 106 facing a rear surface 64 of at least one of the trim piece 20 and/or 26 adjacent the openable passage 36.

The guide member 102 can be associated with at least one of a trim piece 20, 26, a body bracket 108, a pillar bracket 110, or any combination thereof. The guide member 102 positions the stowed side curtain airbag 12 at a constant distance from a back side 64 of the covering trim piece 20 and/or 26 along a corresponding length of the guide member 102. The guide member 102 is shaped to follow a styling path of a structural pillar 112 of the vehicle 18. The guide member 102 extends inwardly from the structural pillar 112 of the vehicle 18 toward a back side 64 of the trim piece 20, 26.

The guide member 102 can include a generally U-shaped cross section 114. The U-shaped cross section 114 of the guide member 102 can include a rear wall portion 116 spaced from the covering trim piece 20 and/or 26, and two side wall portions 118,120 extending from opposite edges 122,124 of the rear wall portion 116 toward the covering trim piece 20 and/or 26. Each side wall portion 118,120 defines an obtuse angle with respect to the rear wall portion 116 of the guide member 102.

The guide member 102 extends longitudinally along the structural pillar 112 between a forward location 126 and a rearward location 128 with respect to the vehicle 18. The guide member 102 can be formed with an energy absorbing guide ramp 130 of sufficient strength to guide deployment of the side curtain airbag 12 toward an interior passenger compartment 16 of the vehicle 18, while being formed to absorb energy from an impact originating internally from within the vehicle 18.

An interface joint 32 can define at least a portion of the openable passage 36 located between a first edge 24 of one trim piece 20 or 26 and a second edge 30. At least one trim piece 20 and/or 26 can include a first trim piece 20 having at least one aperture 22 formed along the first edge 24, and a second trim piece 26 having at least one low-retention force projection 28 receivable within the aperture 22 formed in the first trim piece 20. The projection 28 is formed along a second edge 30 of the second trim piece 26 and is located in complementary position with respect to the aperture 22 of the first edge 24 of the first trim piece 20 to temporarily secure an interface joint 32 defined between the first and second edges 24,30 along the first and second trim pieces 20,26 with respect to one another when in a closed position and to define an openable passage 36 along the interface joint 32 between the first and second edges 24,30 allowing deployment of the side curtain airbag 12. The guided member 102 directs airbag deployment toward the openable passage 36 defined along the interface joint 32 between the first and second edges 24,30.

The projection 28 can include an elongate, generally L-shaped, member 46 having an locking tab 48 located on a distal end 50 for releasable engagement with a shoulder 52 defining a portion of the corresponding aperture 22. The projection 28 can include, alternatively or additionally, an elongate member 54 having a periphery 56 slideably engageable within a guiding surface 58 of aperture 22 for locating the first and second trim pieces 20,26 with respect to one another.

In an interior trim structure 10 for deployment of a side curtain airbag 12 along a sidewall 14 of a passenger compartment 16 adjacent to a rear seat location of a vehicle 18, an embodiment of the invention includes a group of low-retention force projections 44 and complementary interlocking apertures 40 formed along abutting first and second edges 24,30 of a rear pillar trim piece 26 and a center pillar trim piece 20 to temporarily secure an interface joint 32 defined between the abutting first and second edges 24,30 along the trim pieces 20,26 with respect to one another when in a closed position, and to define an openable passage 36 through the interface joint 32 between the first and second edges 24,30 allowing deployment of a side curtain airbag 12. The embodiment can include at least one guide member 102 extending longitudinally along at least a portion of the stowed side curtain airbag 12 and including at least one guide ramp 104 directing deployment of the side curtain airbag 12 toward the openable passage 36. The guide member 102 surrounds the side curtain airbag 12 on three sides to define an airbag deployment opening 106 facing a rear surface 64 of the trim piece 20 and/or 26 adjacent the openable passage 36.

The guide member 102 can extend inwardly from a structural pillar 112 of the vehicle 18 toward a backside 64 of at least one of the trim pieces 20 and/or 26. The guide member 102 can include a generally U-shaped cross section 114 having a rear wall portion 116 spaced from at least one of the trim pieces 20 and/or 26, and two side wall portions 118,120 extending from opposite edges 122,124 of the rear wall portion 116 toward the at least one of the trim pieces 20 and/or 26. At least one side wall portion 118,120 defines an obtuse angle with respect to the rear wall portion 116 of the guide member 102.

The projection 28 can include a low-retention force projection 44 formed as an elongate, generally L-shaped member 46 having a locking tab 48 located on a distal end 50 for releasable engagement with a shoulder 52 defining a portion of the corresponding aperture 40. The projection 28 can include a locating guide projection 42 formed as an elongate member 54 having a periphery 56 engageable with a guiding surface 58 associated with a corresponding aperture 38 for locating the trim pieces 20,26 with respect to one another.

According to an embodiment of the invention, an interior trim structure 10 covers a stowed side curtain airbag 12 and allows deployment of the side curtain airbag 12 through the interior trim structure 10 to a position along a sidewall 14 of a passenger compartment 16 adjacent to a rear seat location of a two door coupe style vehicle 18. The interior trim structure can include a center pillar trim piece 20 and a rear pillar trim piece 26. The rear pillar trim piece can be assembled to the center pillar trim piece. At least one projection 28 is receivable within, and releasably interlocking with, a corresponding aperture 22 formed in one of the trim pieces 20 or 26. The projection 28 is formed along a second edge 30 of another of the trim pieces 20 or 26. Each projection is located in a complementary position with respect to the corresponding aperture 22 formed along the first edge 24 to temporarily secure an interface joint 32 defined between the first and second edges 24,30 when in an abutting relationship with respect to one another in a closed position, and defines an openable passage 36 along the interface joint 32 between the first and second edges 24,30 allowing deployment of the side curtain airbag 12 through the interface joint 32. At least one guide member 102 extends longitudinally along at least a portion of the stowed side curtain airbag 12 and includes at least one guide ramp 104 directing deployment of the side curtain airbag 12 toward the openable passage 36. The guide member 102 surrounds the side curtain airbag 112 on three sides to define an airbag deployment opening 106 facing a rear surface 64 of at least one of the trim pieces 20 and/or 26 adjacent to the openable passage 36. The guide member 102 extends inwardly from a structural pillar 112 of the vehicle 18 toward a backside 64 of at least one of the trim pieces 20 and/or 26, and two side wall portions 118,120 extend from opposite edges 122,124 of a rear wall portion 116 toward at least one of the trim pieces 20 and/or 26.

An operation, as the stowed side curtain airbag 12 is inflated for deployment, the three side wall portions 116,118, 120 of the guide 102 direct expansion and deployment of the side curtain airbag 12 toward the back surface 64 of at least one of the trim pieces 20 and/or 26 applying sufficient pressure in order to release the low-retention force projection 44 from the corresponding aperture 40. More particularly, the locking tab 48 located on an outer end 50 is released from engagement with shoulder 52 defining a portion of the corresponding aperture 40. As the interface joint 32 is opened to define openable passage 36, locating guide projections 42 slidingly engage an outer periphery 56 with guiding surface 58 associated with the corresponding aperture 38. After the interface joint 32 has separated the two adjacent edges 24,30 with respect to one another to define the openable passage 36, the side curtain airbag 12 continues expansion deploying through the openable passage 36 formed between the two trim pieces 20,26. If desired, a fabric covering 60 can optionally be provided for one or both of the trim pieces 20,26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A curtain airbag deployment apparatus for a side wall of a vehicle, comprising:
    a first trim panel;
    a second trim panel;
    a headliner;
    an openable passage including a first interface joint defined by the first trim panel and the second trim panel, and a second interface joint defined by the first trim panel and the headliner; and
    an airbag guide configured to direct deployment of the airbag toward the openable passage and to direct deployment of the airbag such that the airbag extends over the first trim panel when deployed;
    wherein the airbag guide is positioned along at least a portion of the first interface joint and along at least a portion of the second interface joint.

2. The curtain airbag deployment apparatus of claim 1, wherein the first interface joint is positioned rearward of the second interface joint.

3. The curtain airbag deployment apparatus of claim 1, wherein the airbag guide extends from a rearward end that is positioned along the first interface joint to a forward end that is positioned forward of the first interface joint.

4. The curtain airbag deployment apparatus of claim 1, wherein the first trim panel is configured and arranged to conceal at least a portion of a center pillar of the side wall of the vehicle.

5. The curtain airbag deployment apparatus of claim 1, wherein the second trim panel is configured and arranged to conceal at least a portion of a rear pillar of the side wall of the vehicle.

6. The curtain airbag deployment apparatus of claim 1, wherein the first trim panel includes a first peripheral edge and the second trim panel includes a second peripheral edge, and wherein the first interface joint is defined by the first peripheral edge of the first trim panel and the second peripheral of the second trim panel.

7. The curtain airbag deployment apparatus of claim 6, wherein the first peripheral edge and the second peripheral edge are adjacent when the openable passage is closed, and the first peripheral edge and the second peripheral edge are spaced apart when. the openable passage is open.

8. The curtain airbag deployment apparatus of claim 6, wherein the second peripheral edge is positioned above the first peripheral edge.

9. The curtain airbag deployment apparatus of claim 6, wherein the airbag guide is configured and arranged to direct deployment of the airbag toward the second trim panel to force the second peripheral edge apart from the first peripheral edge.

10. The curtain airbag deployment apparatus of claim 6, wherein the headliner includes a third peripheral edge, and wherein the second interface joint is defined by the first peripheral edge of the first trim panel and the third peripheral edge of the headliner.

11. The curtain airbag deployment apparatus of claim 10, wherein the first peripheral edge and the third peripheral edge are adjacent when the openable passage is closed, and the first peripheral edge and the third peripheral edge are spaced apart when the openable passage is open.

12. The curtain airbag deployment apparatus of claim 11, wherein the airbag guide is configured and arranged to direct deployment of the airbag toward the headliner to force the third peripheral edge apart from the first peripheral edge.

13. The curtain airbag deployment apparatus of claim 1, wherein the airbag guide is configured and arranged to direct deployment of the airbag between the first trim panel and the second trim panel, and between the first trim panel and the headliner.

14. The curtain airbag deployment apparatus of claim 1, wherein the airbag guide includes at least one guide ramp for directing deployment of the airbag, toward the openable passage.

15. The curtain airbag deployment apparatus of claim 14, wherein the airbag guide has a generally U-shaped cross-section that includes a rear wall portion that is spaced apart from the openable passage, a lower wall extending from the rear wall toward the first trim panel, and an upper wall extending from the rear wall toward the second trim panel and the headliner.

16. The curtain airbag deployment apparatus of claim 15, wherein each of the upper wall and the lower wall define an obtuse angle with respect to the rear wall.

17. The curtain airbag deployment apparatus of claim 1, wherein the airbag guide is free from contact with the first trim panel and the second trim panel.

18. The curtain airbag deployment apparatus of claim 1, wherein the airbag guide is free from contact with the first trim panel and the headliner.

19. A side wall structure of a vehicle, comprising:
    a center pillar;
    a center pillar trim panel having a first peripheral edge, the center pillar trim panel configured and arranged to conceal the center pillar;
    a rear pillar;
    a rear pillar trim panel having a second peripheral edge, the rear pillar trim panel configured and arranged to conceal the rear pillar;
    a headliner having a third peripheral edge;
    an openable passage including a first interface joint defined by the first peripheral edge and the second peripheral edge, and a second interface joint defined by the first peripheral edge and the third peripheral edge; and
    an airbag guide configured to direct deployment of the airbag toward the openable passage, the airbag guide being positioned along at least a portion of the openable passage and extending from a portion of the first interface joint to a portion of the second interface joint;
    wherein the airbag guide is configured and arranged to direct deployment of the airbag through the first interface joint and the second interface joint and to direct deployment of the airbag such that the airbag extends over the first peripheral edge when deployed.

* * * * *